United States Patent [19]

Baylor

[11] 4,332,425
[45] Jun. 1, 1982

[54] MASTER TRACK LINK ASSEMBLY
[75] Inventor: John M. Baylor, Bettendorf, Iowa
[73] Assignee: J. I. Case Company, Racine, Wis.
[21] Appl. No.: 221,836
[22] Filed: Dec. 31, 1980
[51] Int. Cl.³ .................... B62D 55/20; B67D 55/28
[52] U.S. Cl. ......................................... 305/54; 59/85; 305/58 R
[58] Field of Search .............. 417/218; 59/85; 305/54, 305/58 R

[56] References Cited

U.S. PATENT DOCUMENTS

| | | | |
|---|---|---|---|
| 3,096,661 | 7/1963 | Reinsma et al. | 305/58 R |
| 3,822,923 | 7/1974 | Stedman | 305/58 R |
| 4,050,750 | 9/1977 | Yoshihashi et al. | 305/58 R |

FOREIGN PATENT DOCUMENTS

| | | | |
|---|---|---|---|
| 1156282 | 10/1963 | Fed. Rep. of Germany | 59/85 |
| 2844107 | 4/1979 | Fed. Rep. of Germany | 305/58 R |
| 2817476 | 10/1979 | Fed. Rep. of Germany | 305/54 |

*Primary Examiner*—David A. Scherbel
*Attorney, Agent, or Firm*—Dressler, Goldsmith, Shore, Sutker & Milnamow, Ltd.

[57] ABSTRACT

A optimized two-piece master track link for connecting together the ends of an articulated track is described. The two link parts forming the track link interface together along a generally flat diagonal surface defined by each of the two link parts. Each of the two diagonal flat surfaces has a mutually facing cavity. Each cavity has an interior side wall which faces away from the diagonal surfaces. A complementary dowel pin fits within the hollow space defined by the two cavities and resists separation of the two link parts along three mutually perpendicular directions. Shoe bolts extend from the outside of the track shoe to one of the link parts through the other link part so that both of the link parts are joined to the track shoe. One end of each of the two diagonal flat surfaces is immediately adjacent the track shoe. The opposite end is spaced at an intermediate position between the inner and outer surfaces of the track link.

4 Claims, 6 Drawing Figures

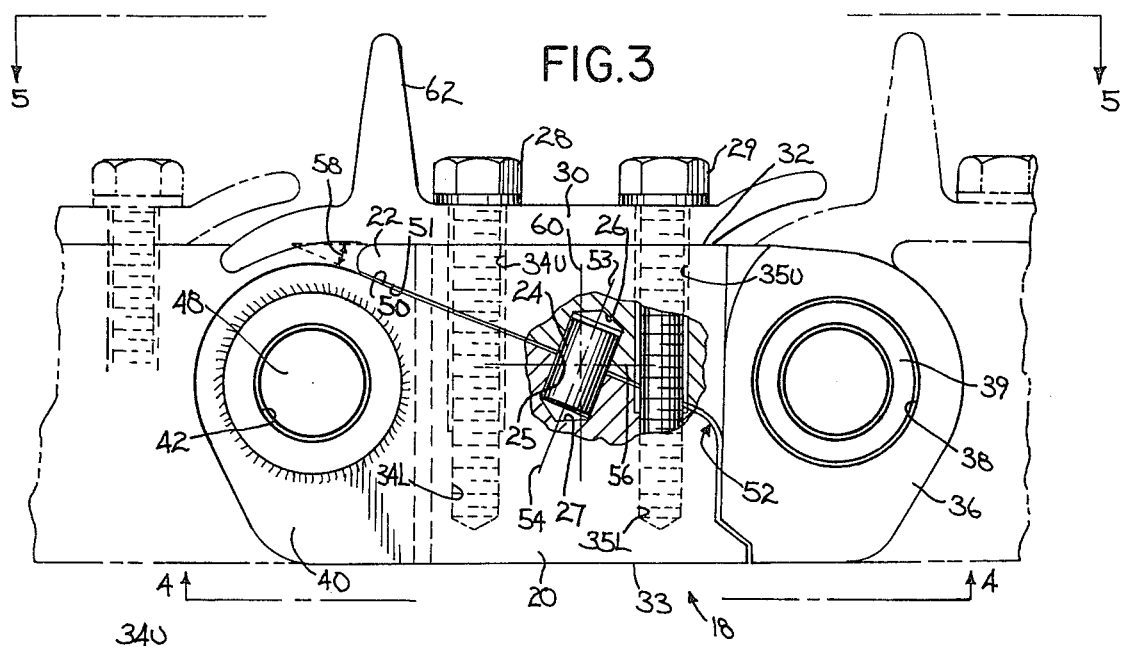

MASTER TRACK LINK ASSEMBLY

Technical Field

This invention relates to track links and in particular to a master track link of the type used in chains, track-type tractor implements, and other crawler-tractor machines.

BACKGROUND OF THE INVENTION

In a track-type machine or crawler tractor, such as a bulldozer, an endless track is formed from a plurality of track shoes carried by links which are pivotably connected by means of hinged pins and bushings. Normally, at least one link assembly, the "master track link" assembly, is constructed to be separable or detachable thereby enabling the endless track to be mounted on or removed from the tractor or machine to which it is attached.

Master track link connections or assemblies commonly comprise two link parts, each adapted to receive a pin and each having a mating surface to interlock with the mating surface of the other link part or half. Preferably, the master track link should provide a connection which is simple enough to permit servicing of the assembled track in the field without having to use special tools. The master track link, of course, should be strong enough to stand up under the stresses experienced during the operation of the machine to which it is attached. Each interconnected link assembly is subject to extremely high tensile and compressive forces resulting from the driving engagement of the sprocket wheels and the hinge joints. It is also desirable to provide master link parts or halves which are easily machined and which facilitate assembly and disassembly of the track link. This is particularly desirable on large machines having relatively heavy endless track assemblies and which, more often than not, must be repaired in the field. Thus, master track links must be both durable and convenient to service if costly down time is to be minimized.

The outer surface of the master track link, like the other links, carries a track shoe. The shoe is joined to the two halves of the master track link by means of shoe bolts or track bolts. Normally, these shoe bolts have a relatively long threaded length to reduce thread fatigue and stress. Experience has shown that master track links formed from half links which are held together by pins or toothed keys reduce the stress imposed upon the shoe bolts. By keeping the stresses on the shoe bolts relatively low, they will not have a tendency to break thereby dislodging or loosening the associated track shoe. Thus, an interlocking, two-piece, master track link has a longer operating life.

Two-piece interlocking master track links have been disclosed. Typical examples are found in U.S. Pat. No. 4,050,750 to Yoshihashi; U.S. Pat. No. 3,427,079 to Skromme; U.S. Pat. No. 3,822,923 to Stedman; and U.S. Pat. No. 3,020,096 to Strand. Heretofore, relatively close tolerances have been required to assure optimum coupling of the two interlocking surfaces and alignment of the shoe bolts joining together the two link parts. If the tolerances are relaxed too far, the two halves of the master track link can come out of alignment. This increases the localized stresses to the point that damage soon results. Track links having relatively close tolerances are costly. An excessive amount of custom fit-up is often required. If the interface between the two master track link parts is too imperfect, dirt or other corrosive materials can be worked into the gaps and cavities in the interface. This accelerates localized corrosion and complicates the removal of the two master track link parts when they must be serviced or repaired.

From the foregoing it should be appreciated that master track link design still leaves room for improvement. An improved track link should distribute the tensile load exerted upon the two halves of the master track link more broadly across the mating surfaces of the link parts to prevent localized stress therein. This would also reduce the load on the shoe bolts. An interfacing surface which can be readily or easily machined and aligned would go far towards minimizing localized corrosion and improving the repairability of the master track link. If the load on the track bolts or shoe bolts could be reduced, there would be less tendency for the shoe bolts to break or fail under load. Finally, a master track link design which is relatively compact and which has a relatively small mating surface or area would have a lower fabrication cost. Ideally, this cost advantage should be gained without compromising the inherent strength of the master link.

SUMMARY OF THE INVENTION

In accordance with the present invention, a unique and improved master track link is provided for joining together the two ends of an articulated track assembly. The master track link is formed from two half-links. The two half-links are joined together along a flat diagonal surface. Each half-link has a cavity which registers with a corresponding complementary cavity in the other half-link so as to form a hollow space, the longitudinal axis of which is perpendicular to the plane of the diagonal interfacing surfaces between the two half-links. A dowel pin is press fitted within the two cavities to interlock the two half-links together. A pair of shoe bolts is used to align the two cavities and to hold the associated track shoe in place. The tensile force across the two half-links is taken up primarily by a shear force applied to the dowel pin and secondarily by the two shoe bolts. The dowel pin, by virtue of its inclination to the inner and outer surfaces of the two half-links, resists the tendency of the two half-links to separate in three mutually perpendicular directions. The diagonal flat surface on the outer half-link is separated from the outer surface of the master track link by a distance generally less than the distance the diagonal flat surface on the inner link part is separated from the inner surface of the master track link (i.e. the diagonal flat surfaces are offset from the mid plane between the inner surface and the outer surface of the master track link). This feature leaves a sufficient volume of material in the outer link part to form the hollow space and to insert the shoe bolts from the outer surface and into the inner link part without unnecessarily extending the length of the link parts, or the length of the diagonal flat surface, or the length of the shoe bolts. In addition, for a given track shoe length, the shoe bolts, when inserted from the outer surface of the master track link and into the inner link part, obtain an adequate grip on the inner link part while leaving a sufficient volume of material between the two shoe bolts to form the hollow space into which the dowel pin is inserted. This allows smaller diameter shoe bolts to be used or an even larger diameter dowel pin. In addition, there is sufficient wall thickness in the half-links around the dowel pin that the half-links are strong in their own right.

Numerous other advantages and features of the present invention will become readily apparent from the following detailed description of the invention and from the embodiment illustrated therein, from the claims, and from the accompanying drawings.

BRIEF DESCRIPTION OF THE DRAWINGS

FIG. 3 is a side, elevational view of the master track link illustrated in FIG. 2 as viewed along line 3—3 of FIG. 2;

FIG. 3A is an enlarged fragmentary view of the dowel pin and half-link cavities shown in FIG. 3;

FIG. 4 is a lower, plan view of the upper link parts illustrated in FIG. 2 with the lower link parts and the track shoe removed; and FIG. 5 is a fragmentary upper plan view of the lower link parts illustrated in FIG. 2 with the upper link parts removed.

DETAILED DESCRIPTION

Figure 1:
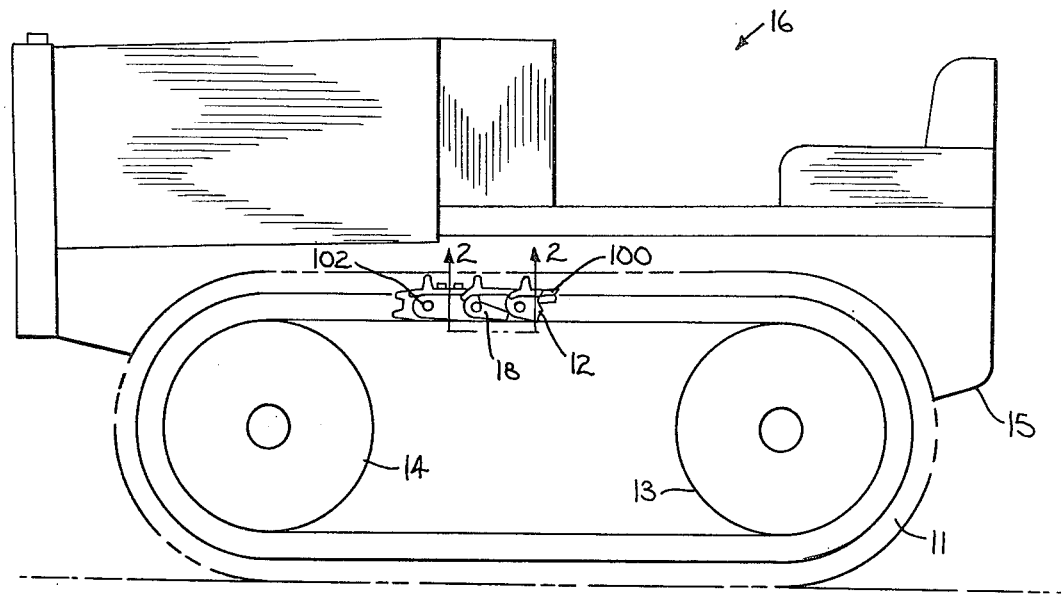
FIG. 1 is a schematic, side, elevational view of a crawler tractor, such as a bulldozer, having an endless track.

While this invention is susceptible of embodiment in many different forms, there is shown in the drawings, and will herein be described in detail, a specific embodiment with the understanding that the present disclosure is to be considered as an exemplification of the principles of the invention and is not intended to limit the invention to that specific embodiment illustrated.

Turning to the figures, FIG. 1 shows an endless articulated track mechanism 11 which comprises a plurality of pivotally interconnected links 12 reeved around and across a rear drive sprocket 13 and a front idler sprocket 14. The two sprockets 13 and 14 are joined to the frame 15 of a tractor or track-type machine 16. At least one master track link 18 is provided in the endless track mechanism 11 to allow the track to be removed from the two sprockets 13 and 14 for repair or replacement. Although the invention is particularly adaptable for use with the articulated endless track of a track-type machine, and will be described by reference to such a use herein, its adaptability to other similar uses will be made apparent as description proceeds.

The major elements of the master track link 18 are illustrated in FIG. 3. The master track link 18 is formed from two overlapping half-links or link parts 20 and 22. The two half-links 20 and 22 are interlocked together by a dowel pin 24 press fitted within a hollow space 25 defined by two dead ended openings or cavities 26 and 27. A pair of shoe bolts 28 and 29 holds a track pad or shoe 30 on the outer or upper surface 32 of one 22 of the two half-links. This track shoe is similar to the other shoes joined to the track mechanism 11. That half-link to which the track pad or shoe 30 is attached is referred to as the "upper or outer half-link" 22. The other half-link is referred to as the "lower or inner half-link" 20. The track shoe defines a cleat 62 to bite into the ground when the tractor 16 is set in motion. The two half-links 20 and 22 are provided with two pairs of matched bores: 34U with 34L and 35U with 35L spaced in the same relation as the other shoe bolts on the track mechanism 11. The lower end of each bore is threaded to couple the shoe bolts 28 and 29 with the two half-links 20 and 22.

Referring to FIG. 4, the upper half-link 22 has at one of its ends an end portion or ear 36 defining a bushing connection bore 38 for receiving a bushing 39. Referring to FIG. 5, the lower half-link 20 has an ear 40 at one of its ends defining a pin connection bore 42. That same ear 40 defines a recess 44 which is concentric with the pin connection bore 42. Because the two ends of the track link 18 mate with the two "ends" of the articulated track mechanism 11, the two sets of ears 36 and 40 are offset from each other (See FIG. 2).

Figure 2:
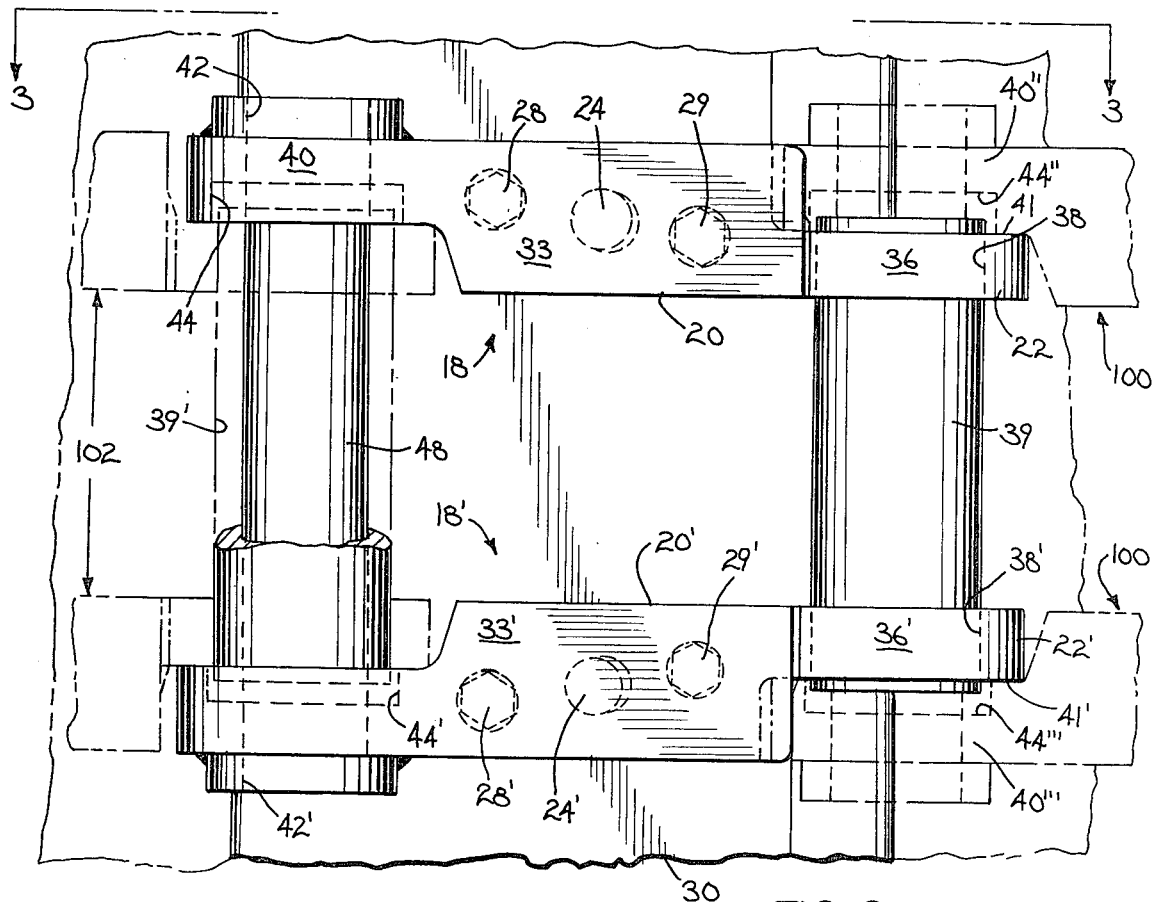
FIG. 2 is a bottom, plan view of one of the master track links shown in FIG. 1 as viewed along lines 2—2 of FIG. 1.

As illustrated, in FIG. 2, a pair of master track links 18 and 18' are joined together by a pair of bushings and pins. One bushing 39 links together the two bushing connection bores 38 and 38'. This bushing 39 extends beyond the outside face 41, 41' of the car 36, 36' on the upper half-link 22, 22' and fits within the complementary recess 44" and 44''' defined in the adjacent link element 100. At the other end of the two master track links 18 and 18', a pin 48 fits within the two pin connection bores 42 and 42'. This pin 48 is surrounded by a bushing 39' carried by the adjacent link element 102. The fit between the bushing 39' and the associated pin 48 is sufficiently loose to permit "hinging" of the connected parts as the track 11 passes around the sprocket wheels 13 and 14 on the tractor 16. The ends of the bushing 39 are press fitted within the bushing connection bores 38 and 38'. The ends of the bushing 39 extend beyond the outer surface 41, 41' of the ear 36, 36' defining the bushing connection bore 38, 38' so as to fit within the complimentary recess 44", 44''' defined by the ear 40", 40''' on the adjacent link element 100. Dirt and other abrasive materials are prevented from gaining entrance into the interface (See arrow 17 in FIG. 5) between the bushing 39' and the pin 48 by this overlap. Similarly, the ends of the associated pin 48 extend beyond ends of the bushing 39' and are press fitted into the adjacent pin connection bores 42 and 42'. The track shoe 30 maintains the lateral spacing between the two master track links 18 and 18'.

Referring to FIG. 3, it should be observed that the two half-links 20 and 22 are non-symmetrical. The two half-links 20 and 22 mate together along two generally diagonal, flat surfaces 50 and 51 (separation is exaggerated in the drawings for ease of understanding). The inner end 52 of the two interfacing surfaces 50 and 51 is offset from the lower surface 33 defined by the lower half-link 20. This is a relatively unusual characteristic for master track links. Heretofore, master track links typically were formed from two half-links or link parts which, except for the interlocking mechanism between the two link parts, were mirror images of each other.

Each diagonal inclined flat surface 50, 51 defines a dead-ended cavity or opening 26, 27. As illustrated in the drawings, each cavity 26, 27 is cylindrical in shape and defines a longitudinal axis 53, 54 that is perpendicular to the plane of the two diagonal surfaces 50 and 51. Thus, the interior walls of the cavities 26 and 27 are substantially perpendicular to the two diagonal surfaces 50 and 51. A dowel pin 24 is press fitted within the hollow space 25 defined by the two cylindrical openings 26 and 27. Preferably, the opening 26 in the upper half link 22 is slightly larger than the opening 27 in the lower half-link 20. This allows the upper half-link to swing away from the lower half link when the two are separated for maintenance. The longitudinal axis of the dowel pin is therefore inclined at an angle relative to the upper surface 32 and the lower surface 33 of the two half-links 20 and 22. As will be explained in the paragraphs following, this is a rather unique and significant approach to master track link design.

As the endless track mechanism 11 is driven across the two sprockets 13 and 14, the master track link 18 is placed in tension. With respect to the orientation of FIG. 3, the tension across the master track link 18 draws the upper half-link 22 to the right and the lower half-link 20 to the left. Since the dowel pin 24 couples the two half-links 20 and 22, a shearing force is applied to the pin. Effectively, the two ends of the dowel pin are forced in opposite directions. Since the axis of dowel pin 24 is inclined to line of action of the two forces or force vectors placing the master track link 18 in tension, the stress in the dowel pin is inversely proportional to the cross-sectional area of the dowel pin defined by a plane paralleling the line of action of the two forces placing a master link in tension and passing through the longitudinal axis of the dowel pin 24. That cross-sectional area is greater than the cross-sectional area of the dowel pin 24 defined by a plane that is perpendicular to the axis of the dowel pin. Consequently, the stress imposed upon the dowel pin is less than the stress imposed upon a dowel pin whose axis is perpendicular to the inner 32 and outer surface 33 of the two half-links 20 and 22. In other words, by inclining the axis of the dowel pin 24 at an angle to the upper surface 32 and the lower surface 33 of the master track link 18, the dowel pin can be subjected to a greater load without failing than a dowel pin of the same diameter whose axis is not so inclined. Stated differently, for the same tension across the master track link 18, a smaller diameter dowel pin can be used if the axis of that dowel pin is inclined to the upper surface 32 and the lower surface 33 of the master track link. Similarly, if one of the half-links is considered fixed relative to the other, placing the links in tension (e.g. right to left) effectively "slides" one of the half-links along the diagonal flat surface 50, 51 of the fixed half-link, thereby exerting tension on the shoe bolts. However, the dowel pin 24 is placed in shear before the bolts have any significant tension applied to them.

The foregoing discussion was addressed to those tensile forces tending to pull apart the master track link along its longitudinal (i.e. right to left using the frame of reference of FIG. 1). The same is also true if the master track link is pulled apart laterally (i.e. top to bottom using the frame of reference of FIG. 2).

Those skilled in the art will appreciate the fact that it is easier to drill a dead ended bore 26, 27 having an axis perpendicular to the surface plane into which it is drilled than it is to drill a bore whose axis is inclined at an angle to the surface in which it is formed. The bores, 34U with 34L and 35U with 35L, into which the two shoe bolts 28 and 29 are fitted, can be formed by first connecting the two half-links 20 and 22 with the dowel pin 24, and then drilling from the upper surface 32 of the upper track link 22. After the bores are formed, the ends in the lower half-link 20 are threaded. This procedure insures that the axes of the two sets of shoe bolt bores are concentric with each other. Those skilled in the art will also appreciate that this is a relatively easy machining process. The net effect is that the overall cost of the master track link 18 is maintained or kept as low as possible without decreasing its overall strength.

Since the two sets of shoe bolt bores, 34U with 34L and 35U with 35L, are matched when the two half-links 20 and 22 are interlocked together by the dowel pin 24, the tension across the master track link 18 is primarily taken up by a shear force across the dowel pin and not across the two shoe bolts 24 and 29. Effectively, the two shoe bolts 28 and 29 act as a "back-up" to the dowel pin 24. One benefit of this arrangement is that the shoe bolts are easier to remove since the tensile stress across the track link 18 is normally taken up by the dowel pin 24. It will also be appreciated that the shoe bolts are subjected to only tensile forces as long as shear forces are taken up by the dowel pin.

There is another benefit to inclining the dowel pin 24 in an angle to the upper surface 32 and the lower surface 33 of the master track link 18. If the dowel pin 24 was not inclined at an angle to the upper surface 32 and the lower surface 33 of the two half-links 20 and 22, the only components keeping the two half-links 20 and 22 from the separating vertically (using the reference frame of FIG. 3) are the two shoe bolts 28 and 29. The strength of the shoe bolts is determined, in part, by the diameter of the bolts and the length of the threaded segments or the threaded length of the four shoe bolt bores 34U with 34L and 35U with 35L. However, by including the dowel pin 24 to the upper surface 32 and the lower surface 33 of the master track link 18, the dowel pin resists the vertical separation of the two half-links. A plane 60, which is perpendicular to the upper surface 32 and the lower surface 33 of the master track link 18 and which passes through the longitudinal axis of dowel pin 24, defines the surface area of the dowel pin across which the tension or the force of separation is applied. Thus, for a given force of separation, the length of the threaded portion 34L and 35L of the four shoe bolt bores can be reduced and/or the diameter of the shoe bolts can be reduced if the dowel pin 24 is inclined at an angle to the upper surface 32 and the lower surface 33 of the master track link 18. Stated differently, the diameter of the shoe bolts 28 and 29 can be reduced for a given diameter dowel pin 24 or, for a given set of shoe bolts, the diameter of dowel pin 24 can be decreased. Those skilled in the art will appreciate the fact that, by reducing the number of threads tapped into the lower half-link 20 and 22, the fabricating cost of the track link is reduced. Thus, the orientation of the dowel pin 24 has a significant impact on the overall strength of the master track link 18 and the overall cost of fabricating the master track link.

Since the dowel pin 24 resists the separation of the two half-links 20 and 22 along three mutually perpendicular directions, after it is inserted into the two dead ended cavities or bores 26 and 27, the two half-links are aligned to each other and the two shoe bolts may be readily inserted. This is of importance when repairs are done in the field where special tools are not readily available. Ordinary mechanics tools can be used to repair and align the endless track mechanism 11 when this master track link 18 is used.

Referring to FIG. 3, it will be observed that as the angle 58, defined by the upper surface 32 of the upper track link 22 and the diagonal surface 51 of the upper track link, increases the interface offset (measured between the inner end 52 of the two diagonal surfaces 50 and 51 and the lower surface 33 of the lower track link 20) becomes shorter and shorter. Thus, as the angle 58 or the degree of inclination of the diagonal surfaces 50 and 51 increases, the depth of the bore 35L at the inner end 52 of the lower track link 20 becomes shallower and shallower (assuming, of course, all other availables remain the same). Since a certain minimum amount of material must be present at the inner end 52 of the lower track link 20 in order for the shoe bolt 29 to grip or "bite" into the lower track link, all things being equal, the offset of the inner end 52 of the diagonal surface 50 from the lower surface 33 on the lower track link 20 should be as large as possible consistent with the load imposed upon the shoe bolts. In other words, if the inner end 52 of the interface between the two half-lnks 20 and 22 was not offset, and, instead, the two diagonal surfaces 50 and 51 were extended at the same angle all the way to lower surface 33 of the half-track link 20, the overall length of the master track link 18 would be increased without increasing the strength of the track link. Alternately, the shoe bolts might have to be extended through the lower surface 33 of the lower half-link 20. Consequently, a master track link design incorporating an offset inner end 52 is effectively a shorter track link or, all things being equal, a track link which requires less material to fabricate. The net effect is that the overall cost of the track link is lowered without reducing the strength of the link.

In one specific embodiment, the master track link has been fabricated using $\frac{5}{8}$ inch diameter shoe bolts, a $\frac{7}{8}$ inch diameter dowel pin and a diagonal surface inclined at an angle of twenty degress relative to the upper surface of the track link.

In view of the foregoing, it should be readily apparent that the structures of the present invention provides a superior master track link which is capable of withstanding severe operational loading conditions and which can be fabricated economically by using relatively conventional equipment and machining operations. While the invention has been described and shown with particular reference to one embodiment, it will be readily apparent that variations are possible. For example, although a cylindrical dowel pin 24 has been illustrated (see FIG. 3A) fitting within a pair of complementary cavities 26 and 27 whose interior walls are substantially perpendicular to the two diagonal surfaces 50 and 51, other shapes can be used. By insuring that the cavity 26 in the upper half-link 22 has an interior side wall 70 the surface of which is disposed toward the upper surface 32 and away from the interfacing surfaces 50 and 51, the complementary dowel pin 24 will be carried upwardly (see FIG. 3) when the upper half-link is moved upwardly. Similarly, by forming the cavity 27 in the lower half-link 24 so that it has an interior side wall 72 whose surface is disposed toward the lower surface 33 and away from the interfacing surfaces 50 and 51, the complementary dowel pin 24 will be carried downwardly with the lower half-link. These two oppositely disposed interior side walls 70 and 72 insure that the dowel pin is placed in tension when the half-links 22 and 24 are pulled apart transversely. Moreover, it is not necessary that these interior side walls be located immediately adjacent the two interfacing surfaces 50 and 51 or that the two cavities 26 and 27 be of the same size and shape as long as the two interior side walls 70 and 72, previously described, are present. These and other variations fall within the spirit of the present invention, and the invention is not to be limited by them, except by the scope of them appended claims.

What is claimed is as follows:

1. A master track link having an outer surface for receiving a track shoe and a transversely spaced opposite inner surface, comprising: two separable link parts with end portions defining longitudinally spaced apart pin connection means and bushing connection means respectively, the interface between said link parts substantially lying along a diagonal flat plane, each of the two diagonal flat surfaces forming said interface defining a cavity, said cavities combining together to define a common hollow space whose axis is generally perpendicular to said two diagonal flat surfaces, said cavities having a first interior wall in one link part the surface of which is disposed away from said flat surfaces and towards said inner surface and having a second interior wall in the other link part the surface of which is disposed away from said flat surfaces and toward said outer surface, that link part having said outer surface is defined as the outer link part and the other link part is defined as the inner link part, one end of the diagonal flat surface on said outer link part converges with the outer surface, the opposite end of the diagonal flat surface on said outer part is located between said outer surface and said inner surface, insertable pin means, complementary to said hollow space, for interlocking together said link parts, whereby said pin means is placed in shear whenever said link parts are pulled apart longitudinally, transversely and laterally; a track shoe displaced along said outer surface; and a bolt means, extending at least partially through said link parts and disposed generally perpendicular to said outer surface, for removably retaining said track shoe in place, whereby link parts are freely separable when said bolt means is removed and one link part is moved away from the other link part along a path generally to said first interior wall or said second interior wall.

2. The master track link as set forth in claim 1, wherein the angle measured from the diagonal flat plane defined by the interface between said link parts to the outer surface is an acute angle.

3. The master link as set forth in claim 2, wherein said bolt means includes at least two bolts threaded so as to couple with that link part defining the inner surface.

4. The master track link as set forth in claim 3, wherein that end of the two diagonal flat surfaces closest to said outer surface is separated from said outer surface by a shorter distance than that end of the two diagonal flat surfaces closest to said inner surface is separated from said inner surface, whereby for a given track shoe length said bolts can be spaced further apart and closer to said end portions and a larger insertable pin means can be used.

* * * * *